Dec. 14, 1926.  1,610,705
G. POPPS
ELECTRIC SWITCH FOR DIRECTION SIGNAL SYSTEMS
Filed March 26, 1925
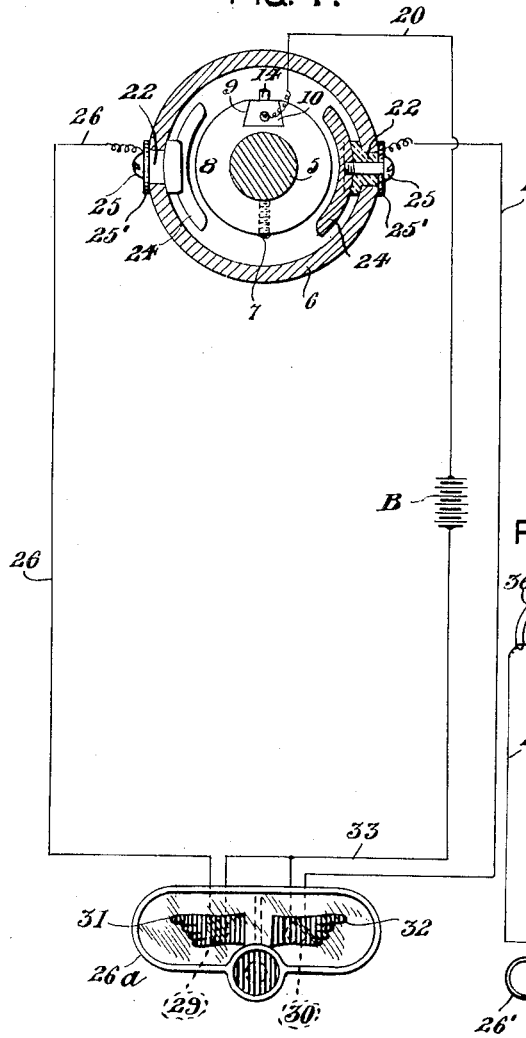
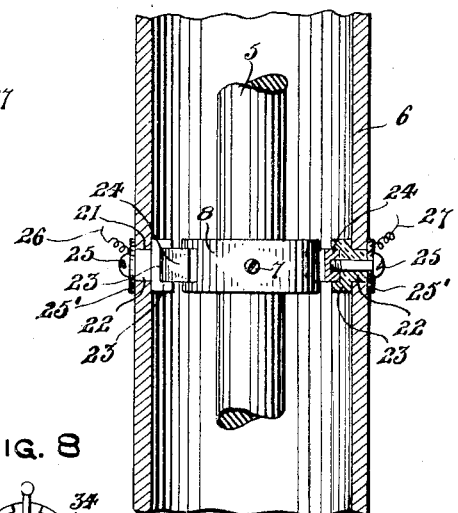
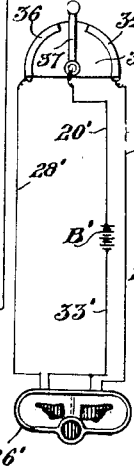
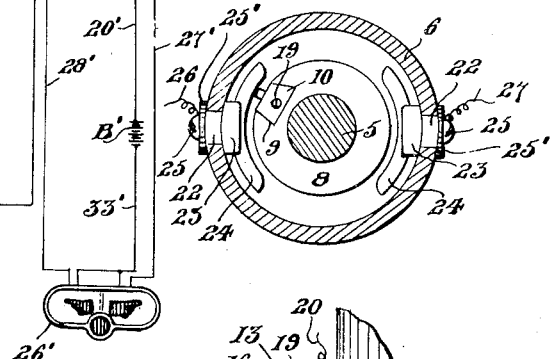
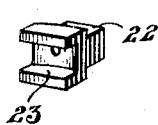
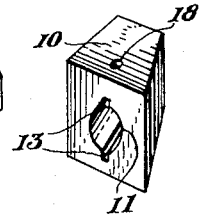
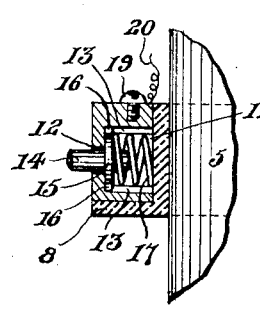
Inventor
G. Popps
By Bryant & Lowry
Attorneys Patented Dec. 14, 1926.

1,610,705

UNITED STATES PATENT OFFICE.

GEORGE POPPS, OF MASSENA, NEW YORK.

ELECTRIC SWITCH FOR DIRECTION-SIGNAL SYSTEMS.

Application filed March 26, 1925. Serial No. 18,514.

The primary object of this invention is to provide an improved form of switch structure for a direction signal system.

A further object of the invention is to provide improved means for mounting the contact members of the above referred to switch structure on the steering post and sleeve of a vehicle steering mechanism so that movement of the post in respect to the sleeve, during the changing of the direction of travel of the vehicle, will cause independent signal circuits to be energized to produce suitable turn indicating signals.

Other objects and advantages of the invention will be apparent during the course of the following description.

In the accompanying drawings forming a part of this specification and in which like numerals are employed to designate like parts throughout the same, Figure 1 is a transverse sectional view taken through a steering mechanism post and sleeve for indicating partly in top plan and partly in section the switch structure embodying this invention which is illustrated as being connected in the diagrammatically shown wiring system connected to a direction signaling lamp, Figure 2 is a fragmentary view partly in section and partly in elevation of the improved switch structure embodying this invention operatively associated with the steering post and sleeve of a steering mechanism, Figure 3 is a similar view to the showing of the switch structure in Fig. 1 and illustrates the movable contact member in engagement with one of the stationary contact members, Figure 4 is a fragmentary vertical sectional view through the movable contact member of the switch structure shown in Figs. 1 to 3 inclusive, Figure 5 is a detail perspective view of a block employed for supporting the movable contact member, Figure 6 is a detail perspective view of one of the stationary contacts, Figure 7 is a detail perspective view of a mounting lug employed for supporting the stationary contact member shown in Fig. 6, and Figure 8 is a diagrammatical view of a hand switch and the signal system controlled thereby.

In the drawing, wherein for the purpose of illustration is shown a preferred embodiment of this invention, the numeral 5 designates the steering mechanism which is surrounded or enclosed by the sleeve 6. Encircling the post 5 and secured thereto by the set screw 7 is a ring 8 having a dovetail-shaped pocket 9 formed therein which opens through the top and front faces of the said ring. Received within this dovetail-shaped pocket 9 is a similarly shaped block 10 having an opening 11 extending thereinto from the inner face of the same which communicates with a smaller opening 12 extending to the front face of the block. Extending longitudinally of the opening 11 and arranged on diametrically opposite sides of the same are the grooves 13. Mounted within the openings 11 and 12 is a button 14 having the flange 15 provided with diametrically opposed lugs 16 slidably received within the grooves 13. A spring 17 is positioned within the opening 11 and forces against the rear face of the flange 12 and the rear face of the pocket 9 for normally maintaining the outer end of the button 14 projecting beyond the front face of the block 10. A threaded hole 18 is formed in the upper face of the block 10 and is provided for receiving the binding terminal 19 by means of which the electric wire 20 is fastened to the block 10. It is to be understood that the ring 8 is formed of insulating material while the button 14 and block 10 are formed of suitable metallic material adapted for conducting electricity.

The sleeve 6 is provided with diametrically opposite squared apertures 21 employed for receiving the squared stems 22 of the stationary contact supporting lugs which are further provided with transversely extending grooves 23 adapted for receiving the arcuate stationary contact strips 24 which are held in place by the binding screws 25, in the manner best illustrated in Figs. 1 and 2. It will be seen that the squared opening 21 and the squared stem 22 will prevent the contact supporting lug from twisting while the groove 23 will prevent the arcuate stationary contact strip 24 from twisting. The said supporting lug is intended to be formed of insulating material while the contact strip 24 is formed of a suitable conducting material. A washer 26 is provided for preventing the head of the contact post 25 from engaging the metallic steering post sleeve 6.

The contact posts 25 are further employed for connecting the circuit wires 26 and 27 to the stationary contact strips 24.

In Fig. 1, a signal casing 28 is illustrated as having the signal lamps 29 and 30 mounted therein in back of the direction indicating hands 31 and 32 respectively. Both of these lamps 29 and 30 are connected to a common wire 33 which leads to one terminal of the battery B which has its remaining terminal connected to the wire 20 leading from the movable contact button 14. The wire 26 connects the remaining terminal of the lamp 29 to one of the stationary contacts while the wire 27 connects the second terminal of the lamp 30 to the remaining stationary contact strip 24. It will now be seen that when the steering post 5 is turned in either direction to change the direction of travel of the vehicle equipped with the same, the movable contact button 14 will be placed in engagement with either of the stationary contact strips 24 for closing the circuit to the signal lamps 29 and 30. The circuit for the bulb 29 includes the wire 20 from the battery to the movable contact button 14, from the button 14 to the stationary contact strip 24 connected to the wire 26, from the wire 26 to one terminal of the lamp 29, and from the remaining terminal of the lamp 29 to the common wire 30 which leads to the second terminal of the battery B. It is believed that the wiring circuit to the bulb 30 will be very apparent.

In Fig. 8, a manually operable switch structure is illustrated as being connected in a similar circuit to the one illustrated in Fig. 1. This manually operable switch structure includes an arcuate stationary contact strip 34 mounted upon one side of the block 35 and a similar contact strip 36 mounted upon the other side of the block. These contact strips are connected by the wires 27' and 28' to terminals of the lamp mounted within the signal casing 26'. The remaining terminals of these lamps are connected by the wire 33' to the battery B' which in turn has its remaining terminal connected by the wire 20' to the manually movable switch arm 37. It will now be apparent that by moving the switch arm 37 into engagement with the contact strip 34, one of the signal lamps will be energized and moving the said arm 37 into engagement with the contact strip 36 will cause the remaining signal lamp to be energized.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a direction signal system of the type described, the combination with a steering post and sleeve of a steering mechanism, of a spring pressed contact button mounted on and insulated from said post, and a pair of arcuate, opposed contact strips mounted within the bore of the sleeve and insulated from each other.

2. In a direction signal system of the type described, the combination with a steering post and sleeve of a steering mechanism, of a contact button mounted on and insulated from said post, and a pair of opposed contact strips mounted within the bore of the sleeve and insulated from each other, the mounting for the contact button including an insulating ring fastened to the post and having a dove-tail-shaped pocket, and a dove-tail-shaped block received in said pocket, said block having an opening to receive the said contact button.

3. In a direction signal system of the type described, the combination with a steering post and sleeve of a steering mechanism, of a contact button mounted on and insulated from said post, and a pair of opposed contact strips mounted within the bore of the sleeve and insulated from each other, the mountings for the opposed contact strips each including an insulating lug formed with a squared stem and a transversely extending groove for receiving the said strip, said sleeve having squared apertures to receive the squared stems of said lugs, and screws for fastening the strips in their respective lug grooves.

In testimony whereof I affix my signature.

GEORGE POPPS.